Aug. 12, 1947.  F. A. TERRY  2,425,446
VALVE FOR LUBRICATION
Filed Aug. 26, 1944
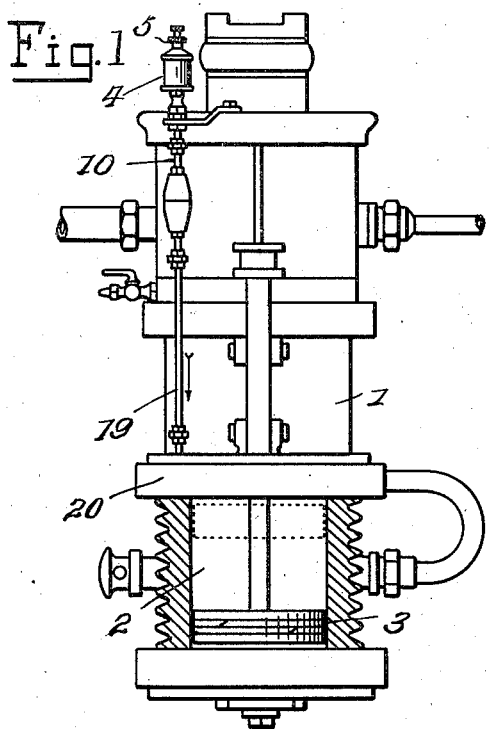
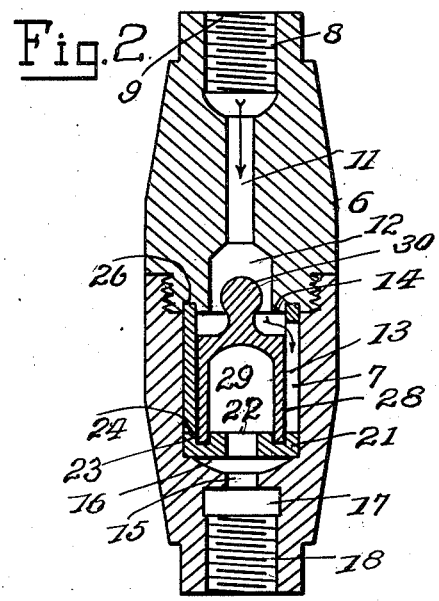
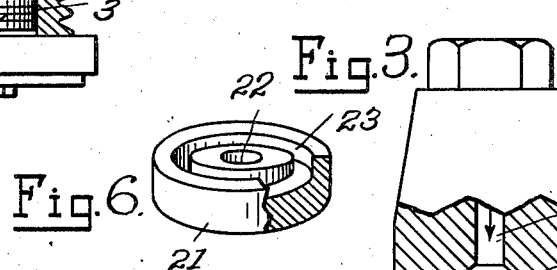
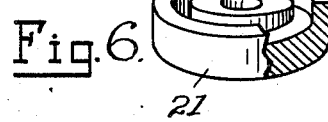
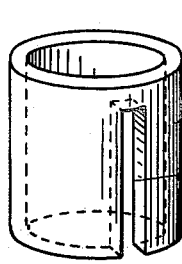
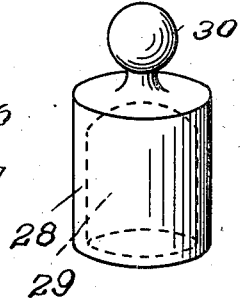
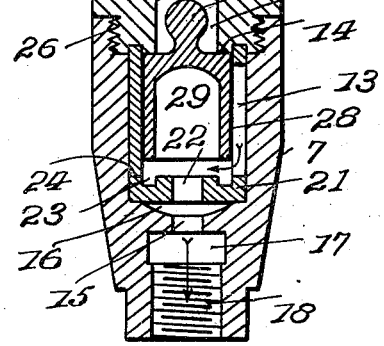
INVENTOR.
Francisco A. Terry
BY
ATTORNEY.

Patented Aug. 12, 1947

2,425,446

UNITED STATES PATENT OFFICE 2,425,446

VALVE FOR LUBRICATION

Francisco Averhoff Terry, Habana, Cuba

Application August 26, 1944, Serial No. 551,342

7 Claims. (Cl. 230—206)

This invention is directed particularly to a valve designed for automatically controlling the lubrication of air compressors and the like, with a view to utilizing the operation of the compressor as a means for feeding the oil to the cylinder of the compressor.

Compressor lubrication as heretofore provided is ordinarily designed to utilize the air pressure of the compressor for direct action on the oil for lubrication purposes, with the result that the oil is more or less influenced in its lubricating value by the air of the air compressor, under which circumstances the oil tends to assume a gelatinous state, with the result to impair its lubricating efficiency. Furthermore, lubrication methods of this type can not ordinarily be re-supplied with oil to be used in lubrication without shutting down the compressor, as generally the force of the air incident to compressor operation tends to blow out the oil being replenished with the result of wastage.

The primary object of the present invention is the provision of a valve for lubrication of air compressors or the like, in which the oil supply is controlled by a valve plunger sensitive to and operated directly by the pressure incident to the movement of the compressor cylinder, with the result that the oil is fed in proper quantity and under ideal circumstances for lubricating effect.

A further object of the invention is the provision of a lubricating valve involving an oil reservoir, preferably transparent for visible reading and capable of being readily replenished at will without interfering with the operation of the compressor.

The invention is illustrated in the accompanying drawing, in which:

Fig. 1 is a view in elevation, partly in section, showing a simple type of compressor to which the improved lubricating valve system has been applied.

Figure 2 is an enlarged vertical section of the valve proper, the elements being shown in the positions occupied when the compressor cylinder is at the limit of its pressure stroke.

Figure 3 is a view similar to Figure 2, showing the valve parts in position occupied when the compressor cylinder is moving to and in its limit of its suction stroke.

Figure 4 is a perspective view of the bushing forming part of the valve assembly.

Figure 5 is a perspective view of the valve plunger proper.

Figure 6 is a broken perspective view of the seat for the valve.

With particular reference to Figure 1, an ordinary compressor 1 is indicated, having a cylinder 2 and an operating or pressure piston 3.

The valve system includes a reservoir 4 having a sealable filling opening 5, and preferably transparent, at least in part, to enable the quantity of oil in the reservoir to be ascertained at any time without interfering with the operation of the mechanism. The valve proper is made up of a valve body, including an upper portion 6 and a lower portion 7, terminally formed respectively for threaded cooperation at 8. The upper portion of the body is formed at one end with a threaded bore 9 to removably receive a pipe 10 in open communication with the reservoir 4. Below the bore 9 and communicating therewith is a central passage 11 diametrically reduced with respect to the bore 9 and terminating at its lower end in an enlarged chamber 12. The lower part 7 of the valve body is formed in its upper portion with a cylindrical chamber 13, which when the parts of the body are assembled is in open communication with the chamber 12 in the part 6. The relative diameters of the chambers 12 and 13 provide an abrupt shoulder 14 at the lower end of the part 6 within the area of the chamber 13 to provide a valve face for a purpose to be later defined.

The lower end of the chamber 13 communicates through a reduced opening 15, the bottom of the chamber 13 leading to the opening being preferably dished or concaved as at 16. Below the opening 15, the part 7 is provided with a diametrically increased chamber 17 communicating with a threaded bore 18, to which a supply pipe 19 is removably connected and leading by appropriate formation 20, indicated in dotted lines in Figure 1, to the upper end of the compressor cylinder 2.

The valve assembly proper includes a valve seat 21, having a diameter corresponding to that of the chamber 13, the seat 21 seating in the lower end of the chamber immediately above the concaved portion 16. The seat has a vertical dimension materially less than that of the chamber 13, and is centrally formed with an opening 22 in line with the opening 15 in the body part 7 and with an annular channel 23 open at the top and closed at the bottom and concentric with the wall of chamber 13, the seat beyond the channel having a square annular ledge 24, which extends directly inward from the annular wall of the chamber 13.

Cooperating with the seat 21 is a bushing 25 in the form of a sleeve-like element, having a diameter corresponding to that of the chamber 13 and fitting snugly in that chamber, as shown more particularly in Figures 2 and 3. The bushing is of a thickness corresponding to that of the ledge 24 of the seat 21, and is designed to rest snugly upon that ledge when in applied position. The vertical dimension of the bushing is such that its upper end is designed to seat in an annular channel 26 in the lower end of the part 6 of the valve body, so that when the parts of the valve body are secured together, the bushing is held in applied position, as indicated. The vertical wall of the bushing is cut out to provide a rectangular channel receiver 27, which opens through the lower edge of the bushing and terminates at the upper edge at a point somewhat below the upper end of the chamber 13.

A valve plunger 28 is fitted to operate snugly in the interior of the bushing 25. This valve plunger constitutes a body formed with a central chamber 29, opening through the lower end of the plunger and closed at the upper end. The valve plunger is formed with an extension 30 having a transverse dimension less than that of the chamber 12 and acting as a weight to insure effective operation of the plunger.

The lower edge of the wall of the plunger is shaped to accurately seat in the annular channel 23 of the base when the plunger is in one position, and to accurately fit within the unbroken upper extremity of the bushing above the channel 27 and to bear against the shoulder 14 in valve cooperation when the plunger is in another position.

In operation, and assuming that the compressor plunger 3 is moving toward the limit of its pressure stroke, the suction in the cylinder 2 will draw the valve plunger 28 into the position indicated in Figure 2, in which case it will be noted that the valve plunger opens the channel 27 in the bushing to the supply from the reservoir 4, but seals the outlet to the cylinder 2 of the compressor through the openings 22, 16 and 15. Oil will thus freely accumulate in the channel 27 by gravity. As the compressor piston 3 moves upwardly under suction stroke, the incident pressure of the air causes the valve plunger to assume the position shown in Figure 3, in which it will be noted that such plunger by cooperation with the annular seat 14 and the upper margin of the valve bushing closes communication between the channel 27 in the bushing and the oil reservoir, but opens communication between such channel 27 and the cylinder 2. The oil then accumulated in the channel 27 has free passage to the cylinder 2 and on the next pressure stroke of the plunger, this oil will be drawn in to mingle with the air in the cylinder for effective lubrication.

It will be apparent therefore that on the suction stroke of the compressor, oil is permitted to freely accumulate under gravity in a particular portion, channel 27, of the valve assembly, and that obviously this channel may be duplicated or adjusted in size to control the quantity of oil so permitted to accumulate. On the suction stroke of the compressor piston, the valve plunger closes this communication between the channel 27 and the oil reservoir, but opens communication between such channel and that of the compressor cylinder, so that on the subsequent stroke, this oil may be delivered to the compressor cylinder. It will be further noted that the action of the valve plunger is automatic incident to the pressure action of the compressor, and that the oil in the reservoir is at no time subjected to the pressure from the compressor and the oil in that reservoir may be readily replenished at any time without danger of wastage or discharge. Furthermore, it will be seen that the air of the compressor does not reach the oil in the reservoir. Therefore, this oil is not contaminated by the mixture therewith of the air from the compressor and will therefore retain its lubricating efficiency for the maximum period of time.

While the invention has been described in connection with a compressor, it is of course apparent that it is equally effective in connection with triple valves, railway car tubing connections, and any and all other installations in which air is subjected to varying pressures and in which lubrication of moving parts may be essential.

Of course, the type of installation indicated in Figure 1 is merely illustrative as the valve may be located in any desired position and the oil reservoir likewise supported in any appropriate position or manner so long as there is gravital feed from the oil reservoir to the valve assembly and so long as the latter is operatively connected to the interior of the cylinder of the mechanism to be lubricated.

What I claim is:

1. An air compressor, a lubricating control valve for use with such air compressors or the like, said valve including a channel-form receiver open to an oil supply, and a member to direct said supply to the compressor, and compressor operated means to open the receiver to the oil supply and simultaneously close the member against the compressor under a suction stroke of the compressor, said means closing the channel-form receiver against the oil supply and opening the receiver to the member and the member to the compressor on a pressure stroke of the compressor.

2. A construction as defined in claim 1, wherein said means includes a valve element movable under compressor action.

3. A construction as defined in claim 1, wherein the receiver is formed with a longitudinally arranging channel and the closing means abruptly cutting off the channel at the respective ends thereof under distinctive compressor suction stroke and pressure stroke movements.

4. A construction as defined in claim 1, wherein the channel-form receiver is mounted as a bushing and wherein the closing means is in the form of a valve plunger guided by and operative in said bushing.

5. An air compressor, a control valve for governing lubrication to the compressor, said valve including a body in the lubricating line to the compressor, a bushing in said body formed with a channel, a valve plunger operating in the bushing without affecting the capacity of the channel, means at one end of the channel to close said channel against an oil supply, and means at the opposite end of the channel to close said channel against the compressor, said valve body cooperating with the respective means under distinctive operations of the compressor.

6. An air compressor, a valve control for lubrication of the air compressor, said control including a valve body formed for the reception of lubrication from a supply, a valve at one end of the body to cut off such communication, a valve at the opposite end of the body to open the body supply to the air compressor, and means operative in the body to alternately and successively close and open said valves under pressure and suction strokes of the compressor respectively.

7. An air compressor, a valve control for the lubrication of the air compressor, including an oil supply, said valve control being arranged intermediate the oil supply and the mechanism and including a channel, a valve part between the channel and oil supply, a valve part between the channel and mechanisms, and a member movable in opposite directions in response to suction and pressure strokes of the air compressor for cooperating with and closing the valve between the oil supply and channel while opening the valve between the channel and air compressor in a pressure stroke of such compressor and in opening the valve between the supply and channel and closing the valve between the channel and air compressor during suction stroke of such compressor.

FRANCISCO AVERHOFF TERRY.

REFERENCES CITED

The following references are of record in the file of this patent:

UNITED STATES PATENTS

| Number | Name | Date |
|---|---|---|
| 963,633 | Newland | July 5, 1910 |
| 771,711 | Clark | Oct. 4, 1904 |
| 1,548,869 | Clore | Aug. 11, 1925 |
| 290,764 | Freeman | Dec. 25, 1883 |
| 1,400,755 | McCuen | Dec. 20, 1921 |
| 1,450,122 | Twardowsky | Mar. 27, 1923 |